US011036160B2

(12) United States Patent
Lim (10) Patent No.: US 11,036,160 B2
(45) Date of Patent: Jun. 15, 2021

(54) ARRANGEMENT OF VERTICES OF CURVED SURFACE OF IMAGING LENS FOR CORRECTING SCANNING LINE CURVATURE

(71) Applicant: Hewlett-Packard Development Company, L.P., Spring, TX (US)

(72) Inventor: Heon Hee Lim, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/961,994

(22) PCT Filed: Sep. 21, 2018

(86) PCT No.: PCT/KR2018/011203
§ 371 (c)(1),
(2) Date: Jul. 14, 2020

(87) PCT Pub. No.: WO2019/142999
PCT Pub. Date: Jul. 25, 2019

(65) Prior Publication Data
US 2021/0072660 A1 Mar. 11, 2021

(30) Foreign Application Priority Data
Jan. 22, 2018 (KR) .................. 10-2018-0007979

(51) Int. Cl.
G03G 15/04 (2006.01)
G03G 15/043 (2006.01)
G02B 26/12 (2006.01)

(52) U.S. Cl.
CPC ....... *G03G 15/0435* (2013.01); *G02B 26/125* (2013.01)

(58) Field of Classification Search
USPC ............................................. 399/4
See application file for complete search history.

(56) References Cited

U.S. PATENT DOCUMENTS

| 5,774,250 A * | 6/1998 | Shimada ............. G02B 26/125 359/205.1 |
| 6,046,835 A | 4/2000 | Yamawaki et al. |
| 2002/0050562 A1 | 5/2002 | Yoshikawa et al. |

(Continued)

FOREIGN PATENT DOCUMENTS

| JP | 2006-251501 A | 9/2006 |
| JP | 2013-190794 A | 9/2013 |

(Continued)

*Primary Examiner* — Q Grainger
(74) *Attorney, Agent, or Firm* — Jefferson IP Law, LLP (57) ABSTRACT

An optical scanning device of an electrophotographic printer is provided. The optical scanning device includes an optical source portion to emit an optical beam inclined in a sub-scanning direction with respect to a reference plane, an optical deflector to deflect and scan the optical beam in a main scanning direction, and an imaging lens to image the deflected optical beam onto a light-exposed object and having an optical axis which is parallel to the reference plane. In order to correct a scanning line curvature, a location of a vertex of a curved surface of the imaging lens in the sub-scanning direction is varied based on a location in the main scanning direction.

15 Claims, 11 Drawing Sheets

(56) References Cited

U.S. PATENT DOCUMENTS

2008/0049286 A1    2/2008   Kim
2013/0141509 A1    6/2013   Park

FOREIGN PATENT DOCUMENTS

| JP | 6047598 B2 | 12/2016 |
| KR | 10-0619037 B1 | 9/2006 |
| KR | 10-1209578 B1 | 12/2012 |

* cited by examiner

ARRANGEMENT OF VERTICES OF CURVED SURFACE OF IMAGING LENS FOR CORRECTING SCANNING LINE CURVATURE

BACKGROUND ART

An electrophotographic printer develops an electrostatic latent image formed on a photoconductor as a visible toner image, transfers the toner image to a recording medium, and fuses the toner image to print the toner image. The electrophotographic printer implements an optical scanning device to deflect light in a main scanning direction, wherein the light is modulated in correspondence with image information, and to irradiate the deflected light onto the photoconductor moving in a sub-scanning direction.

The optical scanning device includes optical devices, such as a collimating lens, a cylindrical lens, an f-theta($\theta$) lens, etc., in order to image light irradiated from a light source in the form of a spot in the photoconductor. The optical scanning device includes a synchronization detector for achieving synchronization in the main scanning direction, that is, horizontal synchronization. The synchronization detector receives a portion of the light deflected in the main scanning direction.

BRIEF DESCRIPTION OF DRAWINGS

The above and other aspects, features, and advantages of certain examples of the present disclosure will be more apparent from the following description taken in conjunction with the accompanying drawings, in which.

Throughout the drawings, it should be noted that like reference numbers are used to depict the same or similar elements, features, parts, components, and structures and thus, a repeated description thereof may be omitted.

MODE FOR THE INVENTION

Reference will now be made to examples, which are illustrated in the accompanying drawings. In this regard, the examples may have different forms and should not be construed as being limited to the descriptions set forth herein. In order to further clearly describe features of the examples, descriptions of other features that are well known to one of ordinary skill in the art are omitted here.

Expressions such as "at least one of," when preceding a list of elements, modify the entire list of elements and do not modify the individual elements of the list.

An electrophotographic printer forms an electrostatic latent image on a surface of a charged photoconductor and attaches a toner to the electrostatic latent image to form a visible toner image. The electrophotographic printer transfers and fuses the toner image to a recording medium to print an image. The electrophotographic printer implements an optical scanning device configured to form the electrostatic latent image by scanning light, modulated based on image information, to a photoconductor charged to have a uniform electric potential.

Figure 1:
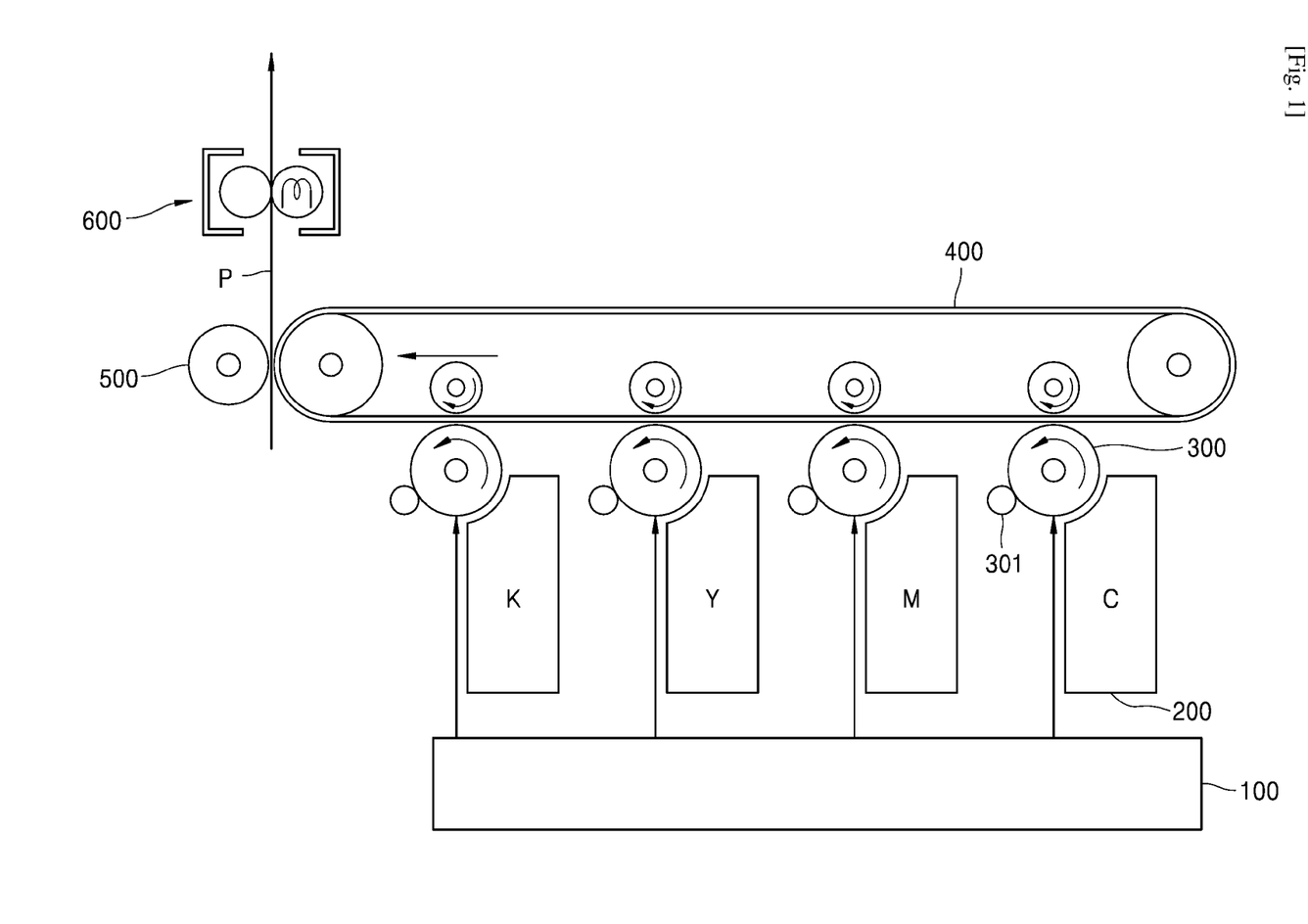
FIG. 1 is a schematic structural view of an electrophotographic printer, according to an example.

FIG. 1 is a schematic structural view of an electrophotographic printer, according to an example.

Referring to FIG. 1, an electrophotographic printer may include a photosensitive drum 300, a charging roller 301, an optical scanning device 100, a developing device 200, an intermediate transfer belt 400, a transfer roller 500, and a fuser 600.

The photosensitive drum 300 is an example of a photoconductor, and may be a photosensitive layer having a certain thickness that is formed on an outer circumferential surface of a cylindrical metal pipe. In an example, the photoconductor may include a photosensitive belt. The charging roller 301 may rotate by contacting the photosensitive drum 300. The charging roller 301 may be an example of a charger that charges a surface of the photosensitive drum 300 to have a uniform electric potential. A charge bias voltage may be applied to the charging roller 301. In an example, a corona charger (not shown) may be used, rather than the charging roller 301. The optical scanning device 100 may form an electrostatic latent image by irradiating an optical beam, which is modulated in correspondence to image information, onto the photosensitive drum 300, as a light-exposed object, charged to have the uniform electric potential.

A toner may be accommodated in the developing device 200. The toner may be moved to the photosensitive drum 300 via a developing bias voltage applied between the developing device 200 and the photosensitive drum 300, to develop the electrostatic latent image into a visible toner image. The toner image formed on the photosensitive drum 300 may be transferred to the intermediate transfer belt 400. The toner image may be transferred to a printing medium P transferred between the transfer roller 500 and the intermediate transfer belt 400, via a transfer bias applied to the transfer roller 500. The toner image transferred to the printing medium P may be fused to the printing medium P by receiving heat and pressure from the fuser 600, and the image formation is completed.

To print a color image, electrostatic latent images corresponding to image information of a black (K) color, a magenta (M) color, a yellow (Y) color, and a cyan (C) color may be formed in four photosensitive drums 300K, 300M, 300Y, and 300C, respectively. Four developing devices 200K, 200M, 200Y, and 200C may provide toners of the black (K) color, the magenta (M) color, the yellow (Y) color, and the cyan (C) color to the photosensitive drums 300K, 300M, 300Y, and 300C, respectively, to form toner images of the black (K) color, the magenta (M) color, the yellow (Y) color, and the cyan (C) color. The toner images of the black (K) color, the magenta (M) color, the yellow (Y) color, and the cyan (C) color may be transferred to the intermediate transfer belt 400 in an overlapping manner and may be transferred to the printing medium P.

The optical scanning device 100 may include an optical source portion configured to emit an optical beam, an optical deflector configured to deflect and scan the optical beam in a main scanning direction, and an imaging lens configured to image the deflected optical beam on a light-exposed object. The optical scanning device 100 used in the electrophotographic printer for printing a color image may scan four optical beams corresponding to the black (K) color, the magenta (M) color, the yellow (Y) color, and the cyan (C) color, and to this end, may require four optical deflectors. A tandem-type optical scanning device may implement a single optical deflector or double optical deflectors, in order to reduce a size of the device and the number of components of the device, wherein the optical beams may be obliquely incident to the optical deflectors in a sub-scanning direction. In the example of FIG. 1, the optical scanning device 100 is the tandem-type optical scanning device implementing a single optical deflector.

Figure 2:
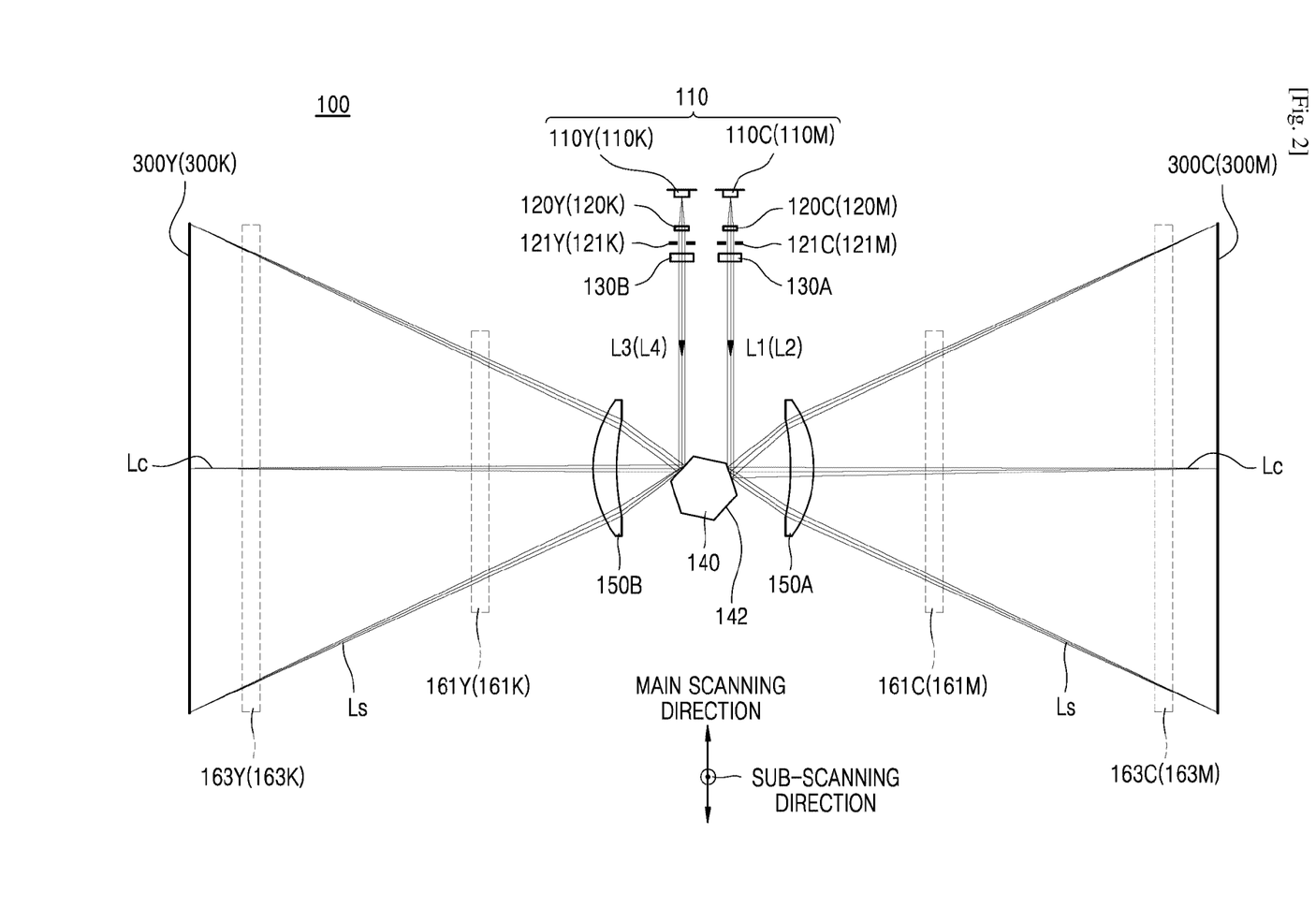
FIG. 2 illustrates a main scanning plane of an optical scanning device, according to an example.
Figure 3:
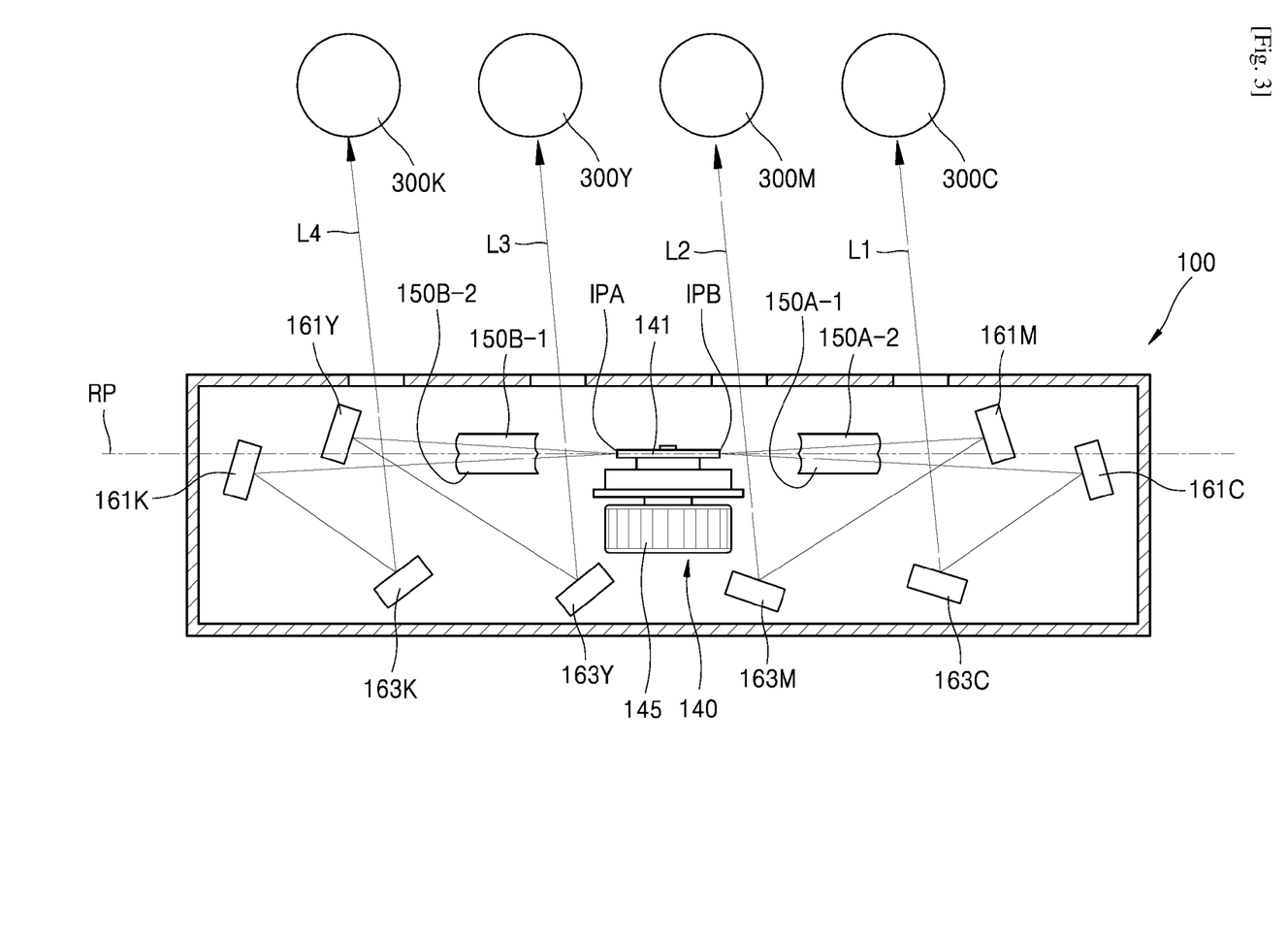
FIG. 3 illustrates a sub-scanning plane of the optical scanning device of FIG. 2, according to an example.

FIG. 2 illustrates a main scanning plane of an optical scanning device, according to an example. FIG. 3 illustrates a sub-scanning plane of the optical scanning device of FIG. 2, according to an example.

Referring to FIGS. 2 and 3, the optical scanning device 100 may be configured to scan a plurality of optical beams L1, L2, L3, and L4 in the main scanning direction, and may include an optical source portion 110 configured to emit the first through fourth optical beams L1, L2, L3, and L4, an optical deflector 140, and an imaging lens configured to image the first through fourth optical beams L1, L2, L3, and L4 on the photosensitive drums 300C, 300M, 300Y, and 300K, respectively. For convenience, FIG. 2 does not illustrate optical paths that are modulated by reflection members 161C, 161M, 161Y, 161K, 163C, 163M, 163Y, and 163K, and illustrates only one of optical components, when the optical components are overlapped when optical beams L1, L2, L3, and L4 are obliquely incident to the optical deflector 140 in the sub-scanning direction.

For example, the optical source portion 110 may include first through fourth optical sources 110C, 110M, 110Y, and 110K. The first through fourth optical sources 110C, 110M, 110Y, and 110K may emit the first through fourth optical beams L1, L2, L3, and L4 corresponding to the photosensitive drums 300C, 300M, 300Y, and 300K, respectively. The first and second optical sources 110C and 110M may form a pair and may be arranged in parallel in a vertical direction. The third and fourth optical sources 110Y and 110K may form a pair and may be arranged in parallel in a vertical direction. The first and second optical sources 110C and 110M and the third and fourth optical sources 110Y and 110K may be arranged to face each other with respect to the optical deflector 140 in the main scanning direction. The number and the arrangement of the optical sources are not limited thereto and may be variously modified. The first through fourth optical sources 110C, 110M, 110Y, and 110K may be arranged on a single circuit board. The first through fourth optical sources 110C, 110M, 110Y, and 110K may include laser diodes irradiating the first through fourth optical beams L1, L2, L3, and L4, respectively.

The optical deflector 140 may include a rotational polygon mirror 141 having a plurality of deflection surfaces, that is, reflection surfaces 142, and a motor 145 configured to rotate the rotational polygon mirror 141. The optical deflector 140 may deflect the first through fourth optical beams L1, L2, L3, and L4 that are incident when the rotational polygon mirror 141 rotates, in the main scanning direction. FIG. 2 illustrates an example in which the optical deflector 140 has six reflection surfaces 142. However, the number of reflection surfaces of the optical deflector 140 is not limited thereto.

Each of the first through fourth optical beams L1, L2, L3, and L4 may be obliquely incident to the optical deflector 140 in the sub-scanning direction, with respect to a reference plane RP. The reference plane RP may be, for example, a plane intersecting a rotation axis of the optical deflector 140 at right angles and including incident points at which the first through fourth optical beams L1, L2, L3, and L4 are incident to the reflection surfaces 142. For example, the first and second optical beams L1 and L2 may be incident to the same incident point IPA, and may be symmetric with each other in the sub-scanning direction with respect to the reference plane RP. Also, the third and fourth optical beams L3 and L4 may be incident to the same incident point IPB, and may be symmetric with each other in the sub-scanning direction with respect to the reference plane RP. The reference plane RP may include both of the incident point IPA and the incident point IPB. Although not illustrated in the drawings, two reference planes each including the incident points IPA and IPB and intersecting the rotation axis of the optical deflector 140 at right angles may be defined. It is illustrated in the drawings that the reference plane RP extends in a lateral direction. However, in reality, the reference plane RP may be reflected by first reflection members 161C, 161M, 161Y, and 161K, and second reflection members 163C, 163M, 163Y, and 163K, to be described below, and may extend along a progression path of the first through fourth optical beams L1 through L4.

Collimating lenses 120C and 120M shaping the first and second optical beams L1 and L2 into parallel beams, and a cylindrical lens 130A focusing the first and second optical beams L1 and L2 to the reflection surfaces 142 of the optical deflector 140 may be provided between the first and second optical sources 110C and 110M and the optical deflector 140. The cylindrical lens 130A may be commonly used for the first and second optical beams L1 and L2. Also, collimating lenses 120Y and 120K shaping the third and fourth optical beams L3 and L4 into parallel beams, and a cylindrical lens 130B focusing the third and fourth optical beams L3 and L4 to the reflection surfaces 142 of the optical deflector 140 may be provided between the third and fourth optical sources 110Y and 110K and the optical deflector 140. In addition, apertures 121C, 121M, 121Y, and 121K may be arranged between the collimating lenses 120C, 120M, 120Y, and 120K, and the cylindrical lenses 130A and 130B, to adjust diameters of the first through fourth optical beams L1 through L4.

The imaging lens may image the first through fourth optical beams L1 through L4 deflected by the optical deflector 140 on outer circumferential surfaces, that is, scanned surfaces, of the photosensitive drums 300C, 300M, 300Y, and 300K, respectively. An optical axis of the imaging lens may be parallel to the reference plane RP. The imaging lens may include first and second imaging lenses 150A and 150B. The first imaging lens 150A may image the first and second optical beams L1 and L2 on the outer circumferential surfaces of the photosensitive drums 300C and 300M, respectively. The second imaging lens 150B may image the third and fourth optical beams L3 and L4 on the outer circumferential surfaces of the photosensitive drums 300Y and 300K, respectively. The first and second imaging lenses 150A and 150B may be arranged at both sides of the optical deflector 140 to face each other in the main scanning direction. The first and second imaging lenses 150A and 150B may be f-θ lenses configured to image the first through fourth optical beams L1 through L4 deflected by the optical deflector 140 on the photosensitive drums 300C, 300M, 300Y, and 300K at a constant speed. An optical design of the first and second imaging lenses 150A and 150B may vary according to distances between the optical deflector 140 and the photosensitive drums 300C, 300M, 300Y, and 300K, locations of the first and second imaging lenses 150A and 150B, etc.

The first reflection members 161C, 161M, 161Y, and 161K, and the second reflection members 163C, 163M, 163Y, and 163K may be members configured to change paths of the first through fourth optical beams L1 through L4, as illustrated in FIG. 3. As the first reflection members 161C, 161M, 161Y, and 161K, and the second reflection members 163C, 163M, 163Y, and 163K, reflection mirrors or total reflection prisms may be adopted. For example, the first reflection members 161C, 161M, 161Y, and 161K, and the second reflection members 163C, 163M, 163Y, and 163K may have a bar-shaped rectangular shape. The first reflection members 161C, 161M, 161Y, and 161K, and the second reflection members 163C, 163M, 163Y, and 163K may change the paths of the first through fourth optical beams L1 through L4, by adjusting inclination angles thereof or shapes of reflection surfaces thereof. The first reflection members 161C, 161M, 161Y, and 161K, and the second reflection members 163C, 163M, 163Y, and 163K may change the paths of the first through fourth optical beams L1 through L4 such that the first through fourth optical beams L1 through L4 may come toward the photosensitive drums 300C, 300M, 300Y, and 300K, after passing through the first and second imaging lenses 150A and 150B.

An optical progression distance from the optical source portion 110 to a surface of the photosensitive drum 300, which is an object that is light-exposed, may vary, based on an angular position in the main scanning direction. For example, a progression distance of optical beams Ls at both ends in the main scanning direction in FIG. 2 is greater than a progression distance of an optical beam Lc in the middle portion in the main scanning direction. Thus, in an optical system in which optical beams are inclined in the sub-scanning direction with respect to the reference plane RP, a scanning line curvature may be generated on the object that is light-exposed.

Figure 4:
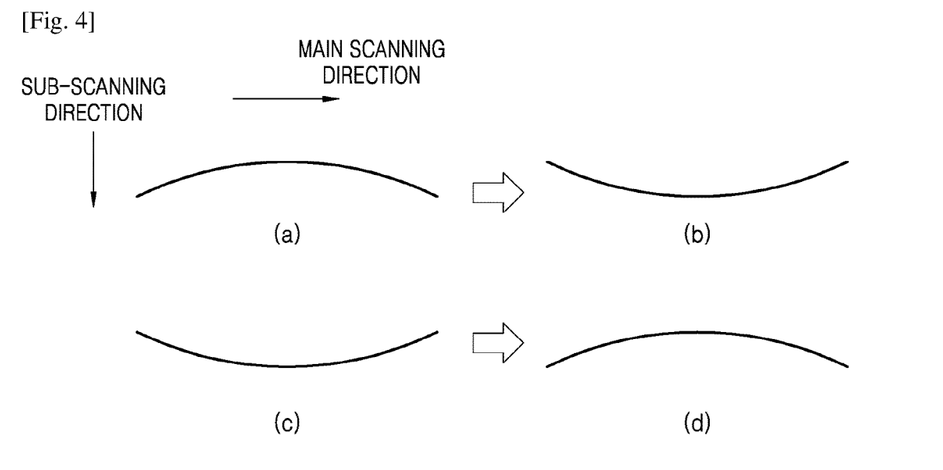
FIG. 4 illustrates a scanning line curvature, according to an example.

FIG. 4 illustrates a scanning line curvature, according to an example.

Referring to FIG. 4, when a refractive power of the imaging lens in the sub-scanning direction is 0, a shape of a scanning line based on an optical beam downwardly inclined with respect to the reference plane RP is as illustrated in frame (a), and a shape of a scanning line based on an optical beam upwardly inclined with respect to the reference plane RP is as illustrated in frame (c). In an example, the imaging lens has a positive refractive power in the sub-scanning direction, and thus, a shape of a scanning line based on the optical beam downwardly inclined with respect to the reference plane RP is as illustrated in frame (b), and a shape of a scanning line based on the optical beam upwardly inclined with respect to the reference plane RP is as illustrated in frame (d). The scanning line curvature may affect color registration in the case of a color image.

In order to correct the scanning line curvature, different curvatures of the imaging lens in the sub-scanning direction may be set, based on a location in the main scanning direction. However, since the curvature of the imaging lens in the sub-scanning direction may affect optical characteristics, such as an optical diameter of an optical beam in the sub-scanning direction, a curvature of image field, etc., it may not be easy to satisfy both the scanning line curvature and the optical characteristics, such as the beam diameter of the optical beam in the sub-scanning direction, the curvature of image field, etc., by adjusting the curvature of the imaging lens in the sub-scanning direction.

An optical scanning device 100 according to an example may not change the curvature of the imaging lens in the sub-scanning direction to correct the scanning line curvature. Rather, the optical scanning device 100 according to an example may differently set a height of a vertex of a curved surface of the imaging lens in the subscanning direction, that is, a distance between the reference plane RP and the vertex of the curved surface of the imaging lens in the sub-scanning direction, depending on a location in the main scanning direction. Hereinafter, the "vertex of the curved surface of the imaging lens in the sub-scanning direction" will be simply referred to as the "vertex." In other words, the location of the vertex in the sub-scanning direction may be differently set based on the location in the main scanning direction. For example, the distance from the reference plane RP to the vertex (or a location (height) of the vertex in the sub-scanning direction) may be represented as the following polynomial Expression (1).

$$x_0 = \Sigma D_n |y|^n \qquad \text{Expression (1)}$$

where:

$x_0$: a distance between the reference plane RP and the vertex (or the location (height) of the vertex in the sub-scanning direction)

n: a disparity of the polynomial expression $D_n$: an $n^{th}$ coefficient y: a location in the main scanning direction Based on this structure, the scanning line curvature may be corrected without affecting the optical characteristics, such as the beam diameter of the optical beam in the sub-scanning direction, the curvature of the image field, etc., or by minimizing effects on the optical characteristics. Thus, a degree of freedom of an optical design of the optical scanning device 100 may be improved.

The imaging lens may have a positive refractive power in the sub-scanning direction and may include an incident surface and an exit surface. The distance (or the location (height) of the vertex in the sub-scanning direction) between the reference plane RP and the vertex may vary based on shapes of the incident surface and the exit surface, that is, whether the incident surface and the exit surface are concave curved surfaces or convex curved surfaces. For example, when an optical beam is incident to the concave curved surface, the optical beam may progress in a divergence direction, that is, a direction away from an optical axis. This tendency increases when the optical beam is incident to a location farther from the vertex of the concave curved surface. Thus, the location of the vertex may be differently set based on the main scanning direction, so that the optical beams Ls at both ends in the main scanning direction are incident to a location near the vertex of the concave curved surface and the optical beam Lc in the middle portion in the main scanning direction is incident to a location far from the vertex of the concave curved surface. For example, in the case of the concave curved surface, the distance between the reference plane RP and the vertex may be less at both ends in the main scanning direction than in the middle portion in the main scanning direction.

On the contrary, when an optical beam is incident to the convex curved surface, the optical beam may progress in a convergence direction, that is, a direction approaching the optical axis. This tendency increases when the optical beam is incident to a location farther from the vertex of the convex curved surface. Thus, the location of the vertex may be differently set based on the main scanning direction, so that the optical beams Ls at both ends in the main scanning direction are incident to a location far from the vertex of the convex curved surface and the optical beam Lc in the middle portion in the main scanning direction is incident to a location near the vertex of the convex curved surface. For example, in the case of the convex curved surface, the distance between the reference plane RP and the vertex may be greater at both ends in the main scanning direction than in the middle portion in the main scanning direction.

Referring again to FIGS. 2 and 3, the first imaging lens 150A may include a first imaging portion 150A-1 corresponding to the first optical beam L1 and a second imaging portion 150A-2 corresponding to the second optical beam L2. The first imaging lens 150A may be an integrated-type lens in which the first imaging portion 150A-1 and the second imaging portion 150A-2 are located to be symmetric with each other in the sub-scanning direction with respect to the reference plane RP. The first imaging portion 150A-1 and the second imaging portion 150A-2 may be located to be symmetric with each other in the sub-scanning direction with respect to the reference plane RP, as separate lenses. Likewise, the second imaging lens 150B may include a third imaging portion 150B-1 corresponding to the third optical beam L3 and a fourth imaging portion 150B-2 corresponding to the fourth optical beam L4. The second imaging lens 150B may be an integrated-type lens in which the third imaging portion 150B-1 and the fourth imaging portion 150B-2 are located to be symmetric with each other in the sub-scanning direction with respect to the reference plane RP. The third imaging portion 150B-1 and the fourth imaging portion 150B-2 may be located to be symmetric with each other in the sub-scanning direction with respect to the reference plane RP, as separate lenses.

Figure 5:
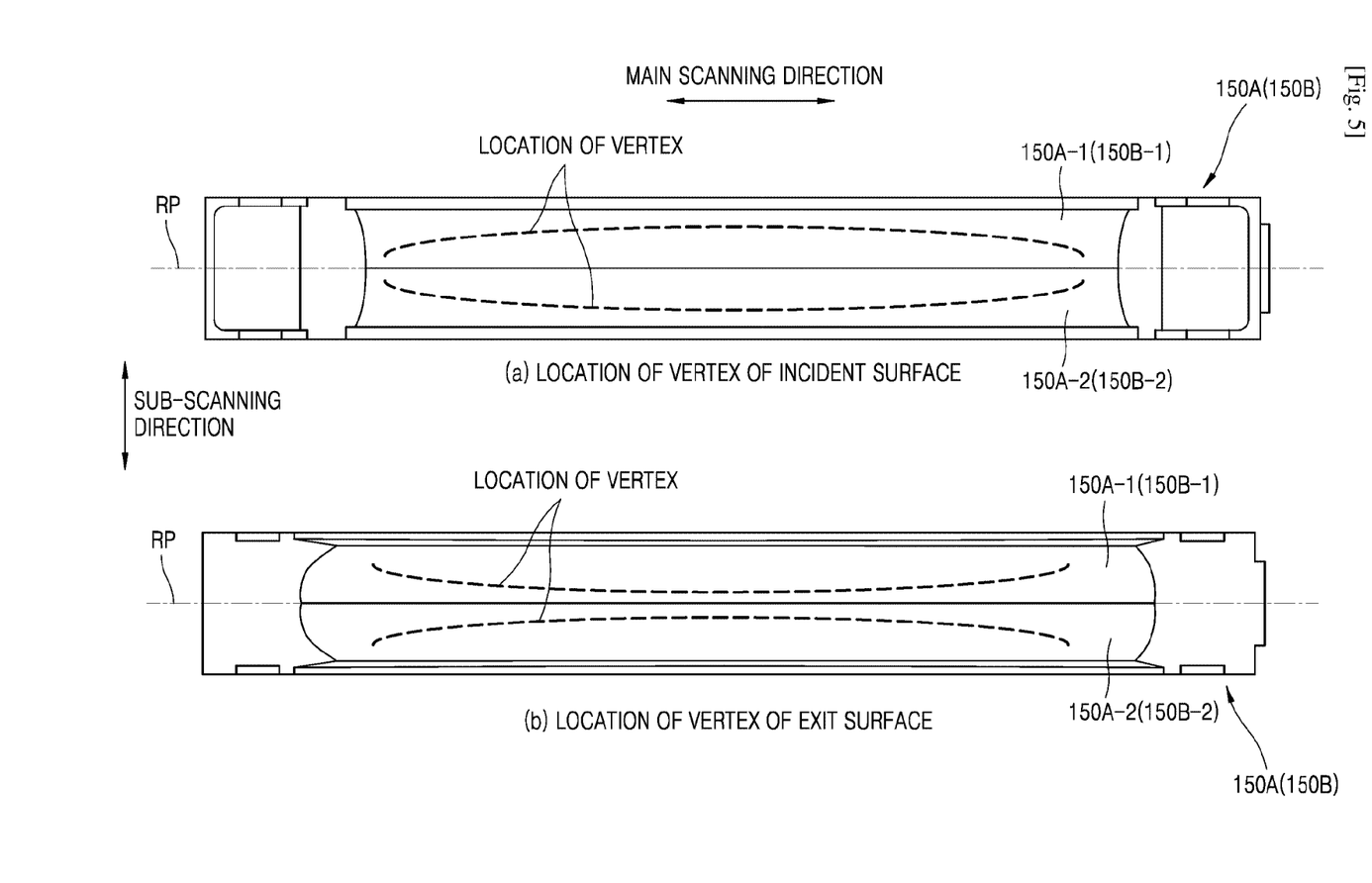
FIG. 5 illustrates locations of vertices of curved surfaces of an incident surface and an exit surface of an imaging lens in a sub-scanning direction, wherein the incident surface of the imaging lens is concave and the exit surface of the imaging lens is convex, according to an example.

FIG. 5 illustrates locations of vertices of curved surfaces of incident surfaces and exit surfaces of first and second imaging lenses, according to an example.

Referring to FIG. 5, the incident surfaces of the first and second imaging lenses 150A and 150B may be concave curved surfaces, and the exit surfaces of the first and second imaging lenses 150A and 150B may be convex curved surfaces.

As illustrated in frame (a), in the concave incident surface, the distance between the reference plane RP and the vertex may be less at both ends in the main scanning direction than in the middle portion in the main scanning direction. That is, the height of the vertex decreases from the middle portion to both ends in the main scanning direction. As illustrated in frame (b), in the convex exit surface, the distance between the reference plane RP and the vertex may be greater at both ends in the main scanning direction than in the middle portion in the main scanning direction. That is, the height of the vertex increases from the middle portion to both ends in the main scanning direction.

Table 1 illustrates an example of an $n^{th}$ coefficient Dn, when, in an imaging lens having the shape illustrated in FIG. 5, an incident angle of an optical beam is 3° with respect to the reference plane RP, and the vertex in the middle portion in the main scanning direction is shifted by 0.74 mm from the reference plane RP.

TABLE 1

|  |  | Incident surface | Exit surface |
|---|---|---|---|
| $Y \geq 0$ | D1 | 0.000E+00 | 0.000E+00 |
|  | D2 | 3.900E−04 | −4.964E−04 |
|  | D3 | 0.000E+00 | 0.000E+00 |
|  | D4 | 8.813E−08 | 2.808E−07 |
| $Y < 0$ | D1 | 0.000E+00 | 0.000E+00 |
|  | D2 | 3.900E−04 | −4.964E−04 |
|  | D3 | 0.000E+00 | 0.000E+00 |
|  | D4 | 8.813E−08 | 2.751E−07 |

Figure 6:
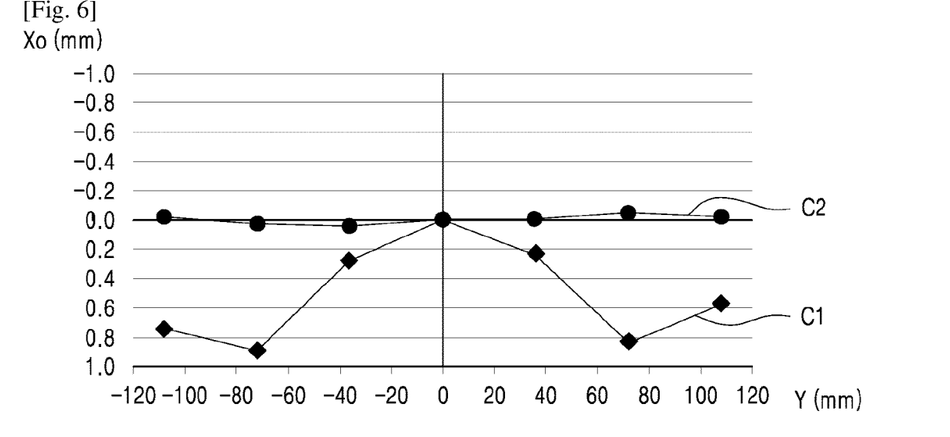
FIG. 6 is a graph illustrating a correction state of a scanning line curvature based on a design of Table 1, according to an example.

FIG. 6 is a graph illustrating a correction state of a scanning line curvature based on a design of Table 1, according to an example.

Referring to FIG. 6, a vertical axis indicates $X_0$, and a horizontal axis indicates y. The line C1 indicates a state before the scanning line curvature is corrected, that is, a state in which the scanning line curvature is generated, when the distance from the reference plane RP to the vertex is the same in the entire main scanning direction. The line C2 indicates a state in which the scanning line curvature is corrected.

Figure 7:
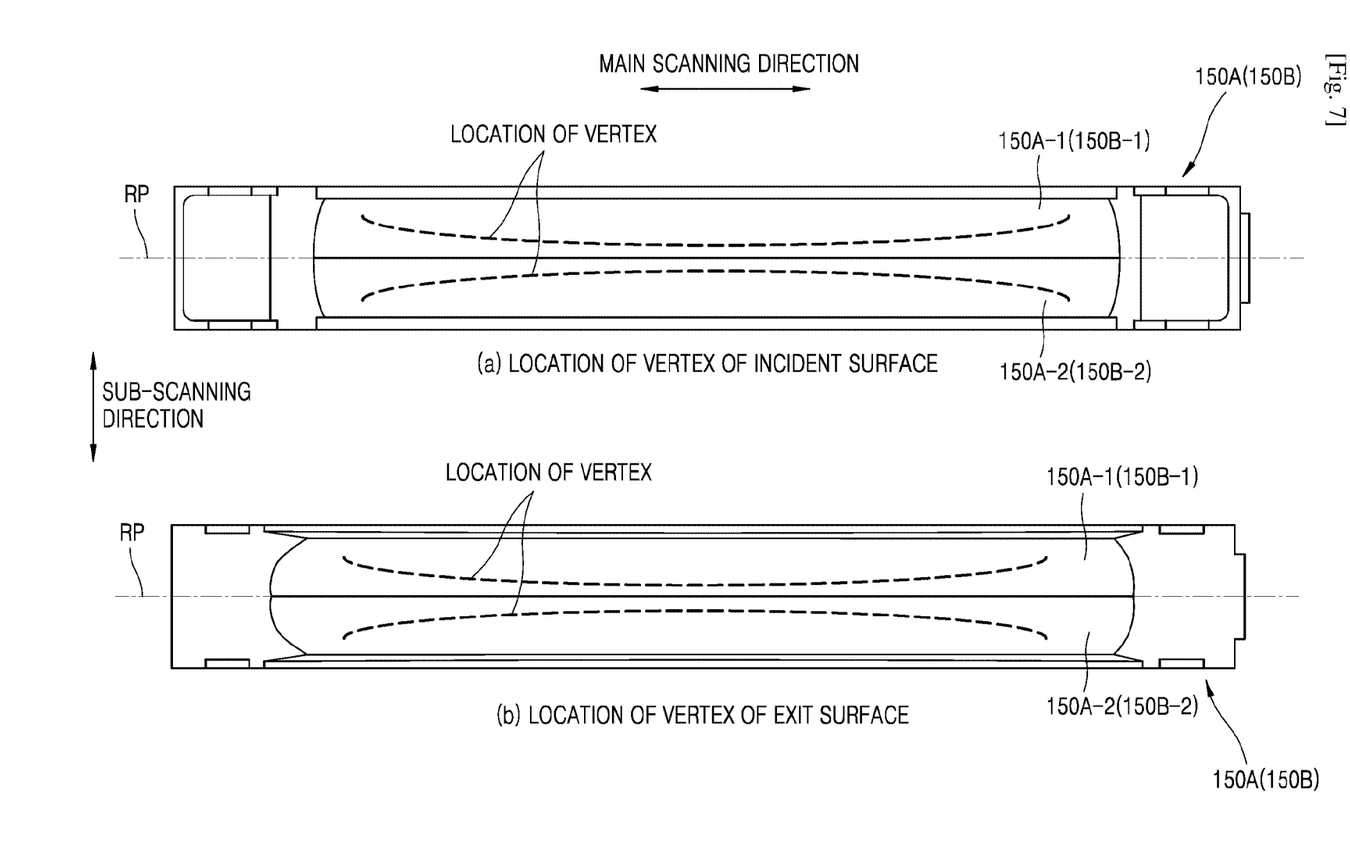
FIG. 7 illustrates heights of vertices of an incident surface and an exit surface of an imaging lens, wherein the incident surface and the exit surface are convex, according to an example.

FIG. 7 illustrates heights of vertices of incident surfaces and exit surfaces of first and second imaging lenses, according to an example.

Referring to FIG. 7, both the incident surfaces and the exit surfaces of the first and second imaging lenses 150A and 150B according to the present example are convex curved surfaces.

As illustrated in frame (a), in the convex incident surface, the distance between the reference plane RP and the vertex may be greater at both ends in the main scanning direction than in the middle portion in the main scanning direction. That is, the height of the vertex increases from the middle portion to both ends in the main scanning direction. Likewise, as illustrated in frame (b), in the convex exit surface, the distance between the reference plane RP and the vertex may be greater at both ends in the main scanning direction than in the middle portion in the main scanning direction. That is, the height of the vertex increases from the middle portion to both ends in the main scanning direction.

Table 2 illustrates an example of an $n^{th}$ coefficient Dn, when, in an imaging lens having the shape illustrated in FIG. 7, an incident angle of an optical beam is 3° with respect to the reference plane RP, and the vertex in the middle portion in the main scanning direction is shifted by 0.74 mm from the reference plane RP.

TABLE 2

|  |  | Incident surface | Exit surface |
|---|---|---|---|
| $Y \geq 0$ | D1 | 0.000E+00 | 0.000E+00 |
|  | D2 | −2.400E−04 | −5.604E−04 |
|  | D3 | 0.000E+00 | 0.000E+00 |
|  | D4 | −5.970E−08 | 2.671E−07 |
| $Y < 0$ | D1 | 0.000E+00 | 0.000E+00 |
|  | D2 | −2.400E−04 | −5.604E−04 |

TABLE 2-continued

|  | Incident surface | Exit surface |
|---|---|---|
| D3 | 0.000E+00 | 0.000E+00 |
| D4 | −3.355E−08 | 2.571E−07 |

Figure 8:
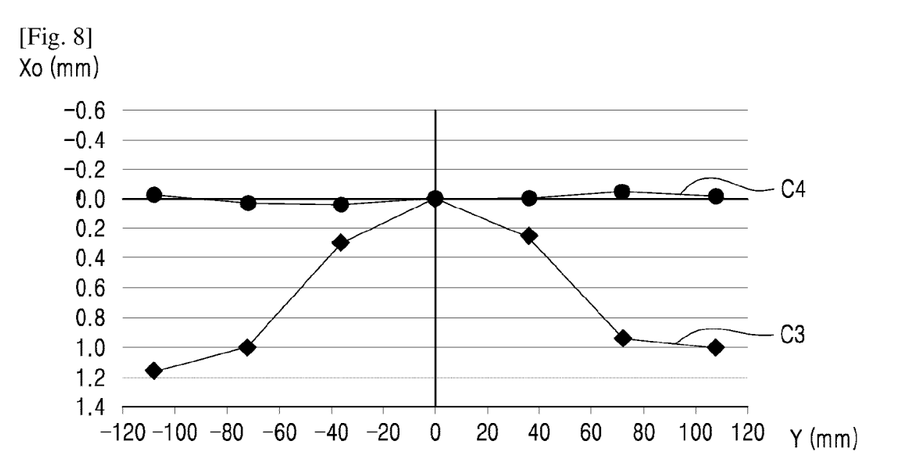
FIG. 8 is a graph illustrating a correction state of a scanning line curvature based on a design of Table 2, according to an example.

FIG. 8 is a graph illustrating a correction state of a scanning line curvature based on a design of Table 2, according to an example.

Referring to FIG. 8, the line C3 indicates a state before the scanning line curvature is corrected, that is, a state in which the scanning line curvature is generated, when the distance from the reference plane RP to the vertex is the same in the entire main scanning direction. The line C4 indicates a state in which the scanning line curvature is corrected.

Figure 9:
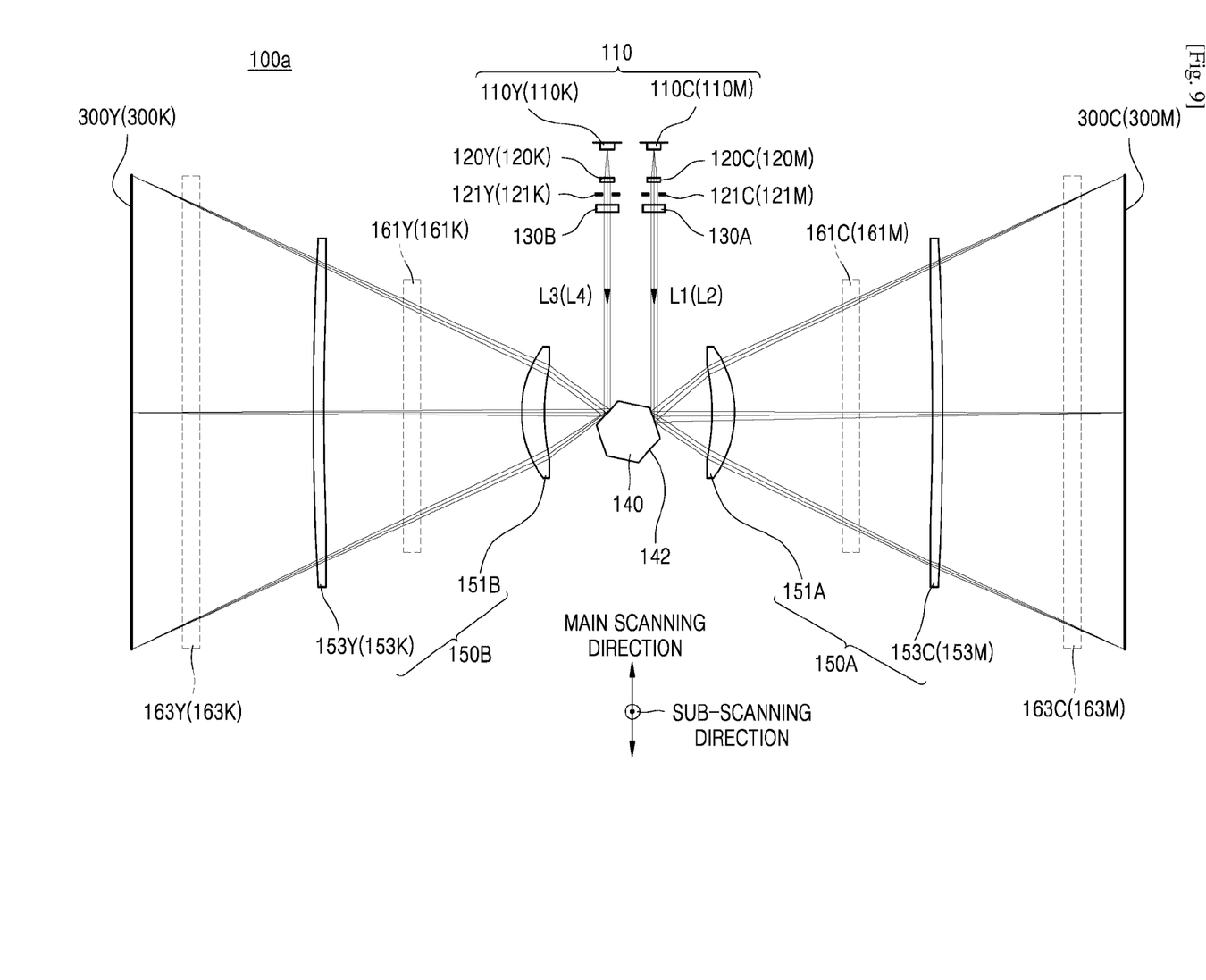
FIG. 9 illustrates a main scanning plane of an optical scanning device, according to an example.
Figure 10:
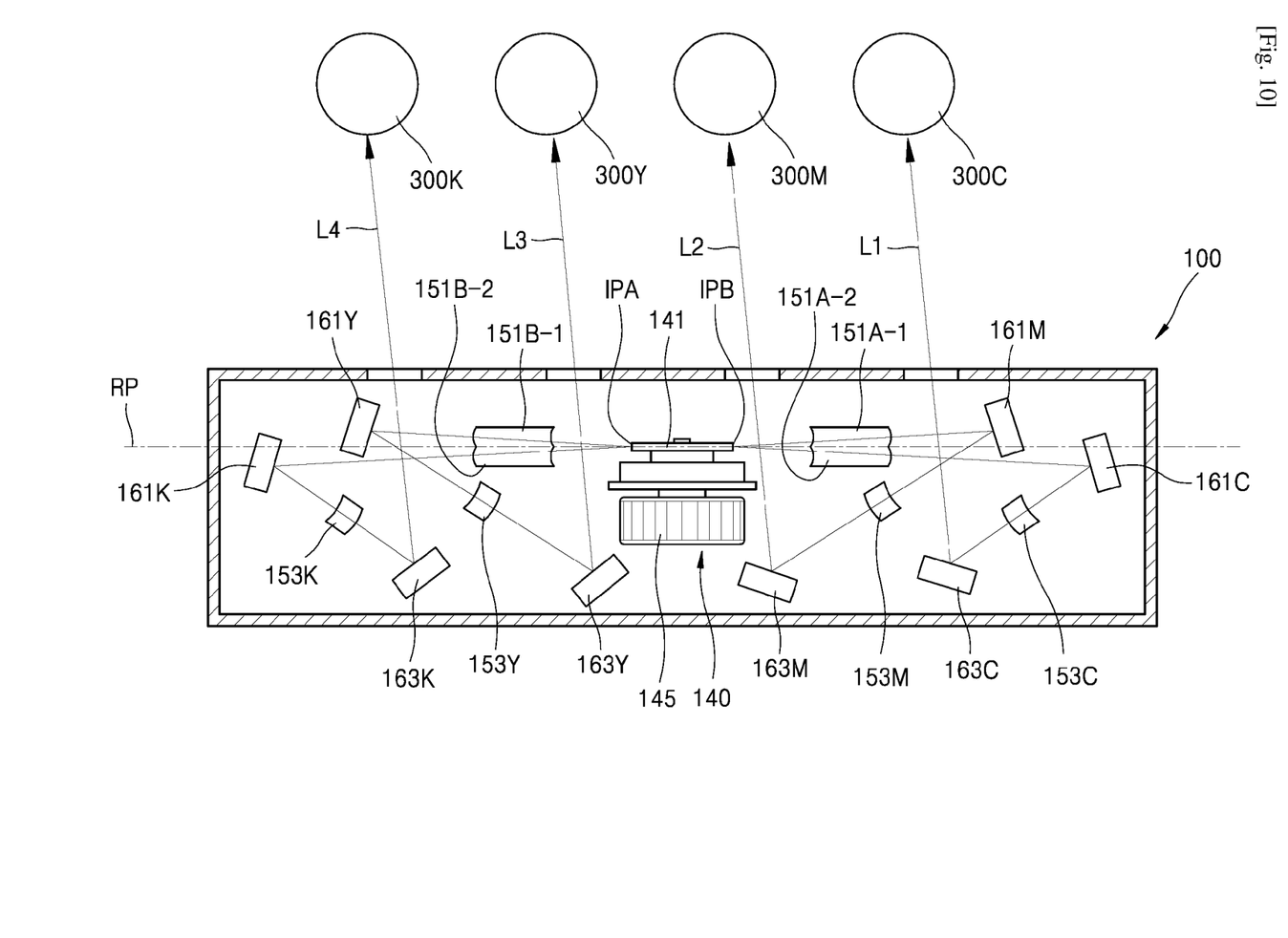
FIG. 10 illustrates a sub-scanning plane of the optical scanning device illustrated in FIG. 9, according to an example.

FIG. 9 illustrates a main scanning plane of an optical scanning device, according to an example. FIG. 10 illustrates a sub-scanning plane of the optical scanning device illustrated in FIG. 9, according to an example.

Referring to FIGS. 9 and 10, the optical scanning device 100a may differ from the optical scanning device 100 illustrated in FIGS. 2 and 3 in that an imaging lens may include first and second lenses arranged in a direction in which the optical beams progress. That is, in FIGS. 9 and 10, the first imaging lens 150A illustrated in FIGS. 2 and 3 is divided into a first lens 151A through which the first and second optical beams L1 and L2 pass, and two second lenses 153C and 153M through which the first and second optical beams L1 and L2 pass, respectively. In FIGS. 9 and 10, the second imaging lens 150B illustrated in FIGS. 2 and 3 is divided into a first lens 151B through which the third and fourth optical beams L3 and L4 pass, and two second lenses 153Y and 153K through which the third and fourth optical beams L3 and L4 pass, respectively. For convenience, FIG. 9 does not illustrate optical paths that are modulated by the reflection members 161C, 161M, 161Y, 161K, 163C, 163M, 163Y, and 163K, and only one of optical components, when the optical components are overlapped when optical beams L1, L2, L3, and L4 are obliquely incident to the optical deflector 140 in the sub-scanning direction.

As also illustrated in FIGS. 9 and 10, one of the first and second lenses may have a refractive power, which is 0, in the sub-scanning direction, and the other may have a positive refractive power in the sub-scanning direction. For example, one of the first and second lenses may have a plane incident surface and a plane exit surface, and the other may have a positive refractive power.

For example, the first lens 151A and the first lens 151B may have a positive refractive power in the sub-scanning direction. In this case, the first lens 151A may include a first imaging portion 151A-1 corresponding to the first optical beam L1 and a second imaging portion 151A-2 corresponding to the second optical beam L2. The first lens 151A may be an integrated-type lens in which the first imaging portion 151A-1 and the second imaging portion 151A-2 are located to be symmetric with each other in the sub-scanning direction with respect to the reference plane RP. The first imaging portion 151A-1 and the second imaging portion 151A-2 may be located to be symmetric with each other in the sub-scanning direction with respect to the reference plane RP, as separate lenses. Likewise, the first lens 151B may include a third imaging portion 151B-1 corresponding to the third optical beam L3 and a fourth imaging portion 151B-2 corresponding to the fourth optical beam L4. The first lens 151B may be an integrated-type lens in which the third imaging portion 151B-1 and the fourth imaging portion 151B-2 are located to be symmetric with each other in the subscanning direction with respect to the reference plane RP. The third imaging portion 151B-1 and the fourth imaging portion 151B-2 may be located to be symmetric with each other in the sub-scanning direction with respect to the reference plane RP, as separate lenses.

For example, the shape of the first lens 151A and the first lens 151B for correcting a scanning line curvature may be the same as that of the first and second imaging lenses 150A and 150B illustrated in FIG. 5. The first lens 151A and the first lens 151B may have concave incident surfaces and convex exit surfaces. In the case of the concave incident surface, the distance between the reference plane RP and the vertex may be less at both ends in the main scanning direction than in the middle portion in the main scanning direction. That is, the height of the vertex decreases from the middle portion in the main scanning direction to both ends in the main scanning direction. In the case of the convex exit surface, the distance between the reference plane RP and the vertex may be greater at both ends in the main scanning direction than in the middle portion in the main scanning direction. That is, the height of the vertex increases from the middle portion in the main scanning direction to both ends in the main scanning direction.

For example, the shape of the first lens 151A and the first lens 151B for correcting the scanning line curvature may be the same as that of the first and second imaging lenses 150A and 150B illustrated in FIG. 7. The first lens 151A and the first lens 151B may have convex incident and exit surfaces. In the case of the convex incident and exit surfaces, the distance between the reference plane RP and the vertex may be greater at both ends in the main scanning direction than in the middle portion in the main scanning direction. That is, the height of the vertex increases from the middle portion in the main scanning direction to both ends in the main scanning direction.

The second lenses 153C, 153M, 153Y, and 153K may have a positive refractive power in the sub-scanning direction, and the optical structure for correcting the scanning line curvature may be provided in the second lenses 153C, 153M, 153Y, and 153K.

Each of the second lenses 153C, 153M, 153Y, and 153K may have a concave incident surface and a convex exit surface. In the case of the concave incident surface, the distance between the reference plane RP and the vertex may be less at both ends in the main scanning direction than in the middle portion in the main scanning direction. That is, the height of the vertex decreases from the middle portion in the main scanning direction to both ends in the main scanning direction. In the case of the convex exit surface, the distance between the reference plane RP and the vertex may be greater at both ends in the main scanning direction than in the middle portion in the main scanning direction. That is, the height of the vertex increases from the middle portion in the main scanning direction to both ends in the main scanning direction.

Table 3 illustrates an example of an $n^{th}$ coefficient Dn, when an incident angle of an optical beam with respect to the second lenses 153C, 153M, 153Y, and 153K each having the concave incident surface and the convex exit surface is 3°, and the vertex of the curved surface in the middle portion in the main scanning direction is shifted by 2.22 mm from the reference plane RP.

TABLE 3

|  |  | Incident surface | Exit surface |
|---|---|---|---|
| Y ≥ 0 | D1 | 0.000E+00 | 0.000E+00 |
|  | D2 | 2.000E−04 | −7.745E−05 |
|  | D3 | 0.000E+00 | 0.000E+00 |
|  | D4 | 0.000E+00 | 0.000E+00 |
| Y < 0 | D1 | 0.000E+00 | 0.000E+00 |
|  | D2 | 2.000E−04 | −7.745E−05 |
|  | D3 | 0.000E+00 | 0.000E+00 |
|  | D4 | 0.000E+00 | 0.000E+00 |

Figure 11:
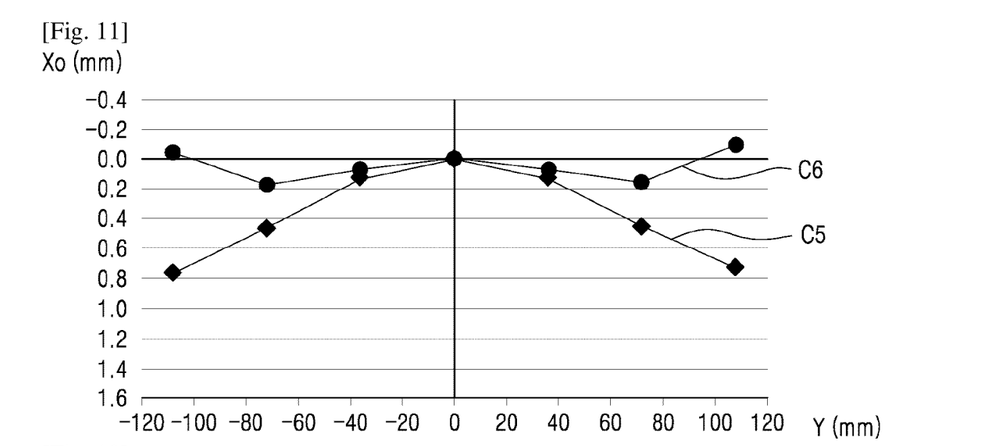
FIG. 11 is a graph illustrating a correction state of a scanning line curvature based on a design of Table 3, according to an example.

FIG. 11 is a graph illustrating a correction state of a scanning line curvature based on a design of Table 3, according to an example.

Referring to FIG. 11, a vertical axis indicates $X_0$, and a horizontal axis indicates y. The line C5 indicates a state before the scanning line curvature is corrected, that is, a state in which the scanning line curvature is generated, when the location of the vertex is the same in the entire main scanning direction. The line C6 indicates a state in which the scanning line curvature is corrected.

Each of the second lenses 153C, 153M, 153Y, and 153K may have convex incident and exit surfaces. In the case of the convex incident and exit surfaces, the distance between the reference plane RP and the vertex may be greater at both ends in the main scanning direction than in the middle portion in the main scanning direction. That is, the height of the vertex increases from the middle portion in the main scanning direction to both ends in the main scanning direction.

Table 4 illustrates an example of an $n^{th}$ coefficient Dn, when an incident angle of an optical beam with respect to the second lenses 153C, 153M, 153Y, and 153K each having the convex incident and exit surfaces is 3°, and the vertex of the curved surface in the middle portion in the main scanning direction is shifted by 2.22 mm from the reference plane RP.

TABLE 4

|  |  | Incident surface | Exit surface |
|---|---|---|---|
| Y ≥ 0 | D1 | 0.000E+00 | 0.000E+00 |
|  | D2 | −3.000E−04 | −9.120E−05 |
|  | D3 | 0.000E+00 | 0.000E+00 |
|  | D4 | 0.000E+00 | 0.000E+00 |
| Y < 0 | D1 | 0.000E+00 | 0.000E+00 |
|  | D2 | −3.000E−04 | −9.120E−05 |
|  | D3 | 0.000E+00 | 0.000E+00 |
|  | D4 | 0.000E+00 | 0.000E+00 |

Figure 12:
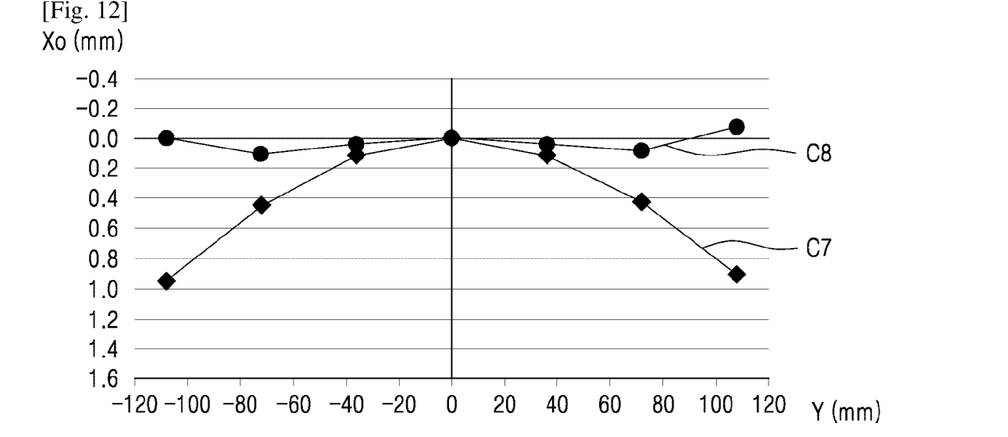
FIG. 12 is a graph illustrating a correction state of a scanning line curvature based on a design of Table 4, according to an example.

FIG. 12 is a graph illustrating a correction state of a scanning line curvature based on a design of Table 4, according to an example.

Referring to FIG. 12, a vertical axis indicates $X_0$, and a horizontal axis indicates y. The line C7 indicates a state before the scanning line curvature is corrected, that is, a state in which the scanning line curvature is generated, when the location of the vertex is the same in the entire main scanning direction. The line C8 indicates a state in which the scanning line curvature is corrected.

Via this structure, the scanning line curvature may be corrected by minimizing effects on the optical characteristics, such as the beam diameter in the sub-scanning direction, the curvature of image field, etc.

While one or more examples have been described with reference to the figures, it will be understood by those of ordinary skill in the art that various changes in form and details may be made therein without departing from the spirit and scope as defined by the following claims.

The invention claimed is:

1. An optical scanning device, the optical scanning device comprising:
   an optical source portion to emit an optical beam inclined in a sub-scanning direction with respect to a reference plane;
   an optical deflector to deflect and scan the optical beam in a main scanning direction; and
   an imaging lens to image the deflected optical beam on a light-exposed object, the imaging lens having an optical axis which is parallel to the reference plane,
   wherein, a location of a vertex of a curved surface of the imaging lens in the sub-scanning direction is varied based on a location of the vertex in the main scanning direction,
   wherein the imaging lens comprises a first lens and a second lens, the first lens and the second lens being arranged in a direction in which the optical beam progresses, and
   wherein each of the first lens and the second lens has a positive refractive power in the sub-scanning direction.

2. The optical scanning device of claim 1,
   wherein, when at least one of an incident surface and an exit surface of one of the first lens and the second lens includes a concave curved surface, a distance from the reference plane to the vertex is less at both ends of the concave curved surface in the main scanning direction than in a middle portion of the concave curved surface in the main scanning direction, and
   wherein, when at least one of the incident surface and the exit surface of one of the first lens and the second lens includes a convex curved surface, a distance from the reference plane to the vertex is greater at both ends of the convex curved surface in the main scanning direction than in a middle portion of the convex curved surface in the main scanning direction.

3. The optical scanning device of claim 1, wherein the optical beam comprises:
   a first optical beam and a second optical beam, which are symmetric with each other in the sub-scanning direction with respect to the reference plane; and
   a third optical beam and a fourth optical beam, which are arranged to face the first optical beam and the second optical beam in the main scanning direction with respect to the optical deflector, and which are symmetric with each other in the sub-scanning direction with respect to the reference plane.

4. The optical scanning device of claim 3
   wherein the first lens comprises a first imaging portion and a second imaging portion, the first imaging portion and the second imaging portion respectively corresponding to the first optical beam and the second optical beam; and
   wherein the second lens comprises a third imaging portion and a fourth imaging portion, the third imaging portion and the fourth imaging portion respectively corresponding to the third optical beam and the fourth optical beam.

5. The optical scanning device of claim 4,
   wherein each of the first through fourth imaging portions comprises an incident surface and an exit surface,
   wherein, when at least one of the incident surface and the exit surface includes a concave curved surface, a distance from the reference plane to the vertex is less at both ends of the concave curved surface in the main scanning direction than in a middle portion of the concave curved surface in the main scanning direction, and wherein, when at least one of the incident surface and the exit surface includes a convex curved surface, a distance from the reference plane to the vertex is greater at both ends of the convex curved surface in the main scanning direction than in a middle portion of the convex curved surface in the main scanning direction.

6. The optical scanning device of claim 5, wherein the first lens and the second lens are arranged to face each other in the main scanning direction with respect to the optical deflector.

7. An optical scanning device, the optical scanning device comprising:

an optical source portion to emit a first optical beam and a second optical beam, the first optical beam and the second optical beam being symmetrically inclined in a sub-scanning direction with respect to a reference plane;

an optical deflector to deflect and scan the first optical beam and the second optical beam in a main scanning direction;

a first imaging lens to image the deflected first optical beam and the second optical beam on a light-exposed object and comprising a first imaging portion and a second imaging portion, the first imaging portion and the second imaging portion being symmetric with each other with respect to the reference plane and having an optical axis which is parallel to the reference plane; and a second imaging lens, wherein, distances from the reference plane to vertices of curved surfaces of the first imaging portion and the second imaging portion in the sub-scanning direction are varied based on a location in the main scanning direction, wherein the first imaging portion and the second imaging lens are arranged in a direction in which the first optical beam progresses, and wherein each of the first imaging portion and the second imaging lens has a positive refractive power in the sub-scanning direction.

8. The optical scanning device of claim 7, wherein each of the first imaging portion and the second imaging portion has an incident surface and an exit surface, wherein, when at least one of the incident surface and the exit surface includes a concave curved surface, the distance from the reference plane to the vertex is less at both ends of the concave curved surface in the main scanning direction than in a middle portion of the concave curved surface in the main scanning direction, and wherein, when at least one of the incident surface and the exit surface includes a convex curved surface, the distance from the reference plane to the vertex is greater at both ends of the convex curved surface in the main scanning direction than in a middle portion of the convex curved surface in the main scanning direction.

9. The optical scanning device of claim 8, wherein the incident surface includes the concave curved surface and the exit surface includes the convex curved surface.

10. The optical scanning device of claim 8, wherein both of the incident surface and the exit surface include the concave curved surface.

11. An optical scanning device of an electrophotographic printer, the optical scanning device comprising:

an optical source portion to emit a first optical beam and a second optical beam, the first and second optical beams being symmetrically inclined in a sub-scanning direction with respect to a reference plane;

an optical deflector to deflect and scan the first optical beam and the second optical beam in a main scanning direction; and an imaging lens to image the deflected first optical beam and second optical beam on a light-exposed object, wherein the imaging lens comprises a first lens and a second lens, the first lens and the second lens being arranged in the main scanning direction, wherein each of the first lens and the second lens has a positive refractive power in the sub-scanning direction, and wherein, a location of a vertex of a curved surface of the imaging lens in the sub-scanning direction is varied based on a location of the vertex in the main scanning direction.

12. The optical scanning device of claim 11, wherein, when at least one of an incident surface and an exit surface of one of the first lens and the second lens includes a concave curved surface, and the one of the first lens and the second lens has a positive refractive power in the sub-scanning direction, a distance from the reference plane to the vertex is less at both ends of the concave curved surface in the main scanning direction than in a middle portion of the concave curved surface in the main scanning direction, and wherein, when at least one of the incident surface and the exit surface of one of the first and second lenses includes a convex curved surface, and the one of the first lens and the second lens has a positive refractive power in the sub-scanning direction, a distance from the reference plane to the vertex is greater at both ends of the convex curved surface in the main scanning direction than in a middle portion of the convex curved surface in the main scanning direction.

13. The optical scanning device of claim 2, wherein the incident surface of the first lens includes the concave curved surface and the exit surface of the first lens includes the convex curved surface, and wherein the incident surface of the second lens includes the concave curved surface and the exit surface of the second lens includes the convex curved surface.

14. The optical scanning device of claim 2, wherein both of the incident surface and the exit surface of the first lens include the concave curved surface, and wherein both of the incident surface and the exit surface of the second lens include the concave curved surface.

15. The optical scanning device of claim 2, wherein both of the incident surface and the exit surface of the first lens include the convex curved surface, and wherein both of the incident surface and the exit surface of the second lens include the convex curved surface.

* * * * *